United States Patent
Kim et al.

(10) Patent No.: US 7,027,234 B2
(45) Date of Patent: Apr. 11, 2006

(54) IMAGE-FORMING OPTICAL SYSTEM

(75) Inventors: Jae-Bum Kim, Changwon (KR); Young-Ran Kim, Changwon (KR)

(73) Assignee: Samsung Techwin Co., Ltd., Changwon (KR)

( * ) Notice: Subject to any disclaimer, the term of this patent is extended or adjusted under 35 U.S.C. 154(b) by 4 days.

(21) Appl. No.: 10/824,583

(22) Filed: Apr. 14, 2004

(65) Prior Publication Data

US 2004/0257678 A1    Dec. 23, 2004

(30) Foreign Application Priority Data

Jun. 20, 2003  (KR) .................... 10-2003-0040205

(51) Int. Cl.
*G02B 3/02* (2006.01)
(52) U.S. Cl. ..................................... 359/717
(58) Field of Classification Search ......... 359/713–717
See application file for complete search history.

(56) References Cited

U.S. PATENT DOCUMENTS 6,813,100 B1 * 11/2004  Yamaguchi et al. ........ 359/793
6,833,968 B1 * 12/2004  Do .............................. 359/795
2003/0081330 A1 * 5/2003  Do et al. ..................... 359/717
2004/0036983 A1 * 2/2004  Ninomiya et al. .......... 359/719

FOREIGN PATENT DOCUMENTS

| JP | 2002-296496 A | 3/2001 |
| JP | 2002-372666 A | 6/2001 |
| JP | 2003-075719 A | 9/2001 |

* cited by examiner

Primary Examiner—Scott J. Sugarman
Assistant Examiner—Darryl J. Collins
(74) Attorney, Agent, or Firm—Gardner Carton & Douglas LLP

(57) ABSTRACT

The present invention is directed to an image-forming optical system. The image-forming optical system according to the present invention contains, in order from an object side: an iris diaphragm; a first lens having a positive refractive power and at least one aspheric surface; and a second lens having a negative refractive power and at least one aspheric surface. In accordance with the present invention, there is provided an image-forming optical system for cameras using an image pickup device that has a small number of lenses to easily realize the compactness and satisfies a requirement for a high optical performance.

24 Claims, 14 Drawing Sheets

IMAGE-FORMING OPTICAL SYSTEM

CROSS REFERENCE TO RELATED APPLICATION

This application claims priority to and the benefit of Korean Patent Application No. 2003-40205 filed on Jun. 20, 2003 in the Korean Intellectual Property Office, the content of which is incorporated herein by reference.

BACKGROUND OF THE INVENTION (a) Field of the Invention

The present invention relates to an image-forming optical system. More specifically, the present invention relates to a miniature image-forming optical system for cameras using an image pickup device such as a charge coupled device (CCD).

(b) Description of the Related Art

Recently, the use of electronic still cameras and video cameras employing a CCD or a solid-state image pickup device has been expanding rapidly, and the needs for miniaturization and weight/cost savings are increasing. With the desire for greater compactness, miniature cameras such as mobile camera, web camera, or the like are increasingly used. Such miniaturization and weight/cost savings are also needed for the image-forming optical systems that are built into cameras.

A long retrofocal length must be taken into consideration in designing an optical system using a solid-state image pickup device. The optical system employs a crystal filter to prevent moiré caused by the periodical structure of the image pickup device, and a protective glass plate necessarily used due to the structure of the image pickup device. Therefore, the thickness and location of the crystal filter and the protective glass plate must be considered to secure a long retrofocal length in designing the optical systems. The optical system of which the image pickup device is sensitive to the light in the infrared (IR) region may have a problem of "saturation," so there is a need for additionally using an infrared (IR) cut-off filter to reduce the sensitivity of the image pickup device to the IR region and to enhance transmissibility in the visible region. Thus such a long retrofocal length must be secured.

In addition, the optical system is also required to allow entrance of a large amount of light into lenses for the sake of compensation of a deterioration of the sensitivity caused by a high pixel value of the image pickup device, and to secure a large amount of peripheral light with respect to the center because of such a low sensitivity of the image pickup device.

The conventional image-forming optical systems using a solid-state image pickup device designed to satisfy these requirements are disclosed in Japanese Patent Application Laid-Open Nos. 2002-372666, 2002-296496, and 2003-75719.

These conventional optical systems are usually comprised of at least eight lenses in order of a first lens group having a positive refractive power, an iris diaphragm, and a second lens group having a negative refractive power. The use of such a large number of lenses makes it difficult to realize compactness of the optical system.

SUMMARY OF THE INVENTION

It is an advantage of the present invention to provide an image-forming optical system for cameras using an image pickup device that comprises a small number of lenses to easily realize compactness and satisfies a requirement for a high optical performance.

It is another advantage of the present invention to provide a miniature image-forming optical system that increases the peripheral light to effectively correct the sensitivity of the image pickup device.

In a first aspect of the present invention, there is provided an image-forming optical system comprising, in order from an object side: an iris diaphragm; a first lens having a positive refractive power and at least one aspheric surface; and a second lens having a negative refractive power and at least one aspheric surface, the image-forming optical system satisfying the following conditional expression:

$$1.25 < \frac{L_T}{f} < 1.58$$

In a second aspect of the present invention, there is provided an image-forming optical system comprising, in order from an object side: an iris diaphragm; a first lens having a positive refractive power and at least one aspheric surface; and a second lens having a negative refractive power and at least one aspheric surface, the image-forming optical system satisfying the following conditional expression:

$$-1.5 < \frac{W_p - W}{W_p} < -0.1$$

The image-forming optical system according to the first and second aspects of the present invention further satisfies the following conditional expression:

$$25 < Vd_1 - Vd_2 < 30$$

In a third aspect of the present invention, there is provided an image-forming optical system comprising, in order from an object side: an iris diaphragm; a first lens having a positive refractive power and at least one aspheric surface; and a second lens having a negative refractive power and at least one aspheric surface, the image-forming optical system satisfying the following conditional expression:

$$0.75 < \frac{f_B}{f} < 0.95$$

In a fourth aspect of the present invention, there is provided an image-forming optical system comprising, in order from an object side: an iris diaphragm; a first lens having a positive refractive power and at least one aspheric surface; and a second lens having a negative refractive power and at least one aspheric surface, the image-forming optical system satisfying the following conditional expression:

$$-1.5 < \frac{W_p - W}{W_p} < -0.02$$

The image-forming optical system according to the third and fourth aspects of the present invention further satisfies the following conditional expressions:

$$\frac{|R_1|}{f} > 2.1$$

-continued $$\frac{L_T}{f_B} < 2.4$$

$$0.35 < \frac{t_2}{f} < 0.52$$

$$0.14 < \frac{t_4}{f} < 0.23$$

In the image-forming optical system according to the first through the fourth aspects of the present invention, the first and second lenses may have an aspheric surface on both sides thereof. Alternatively, the second lens may be a meniscus lens having a convex image side, and the first lens may be a lens having a convex image side.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

Figure 1:
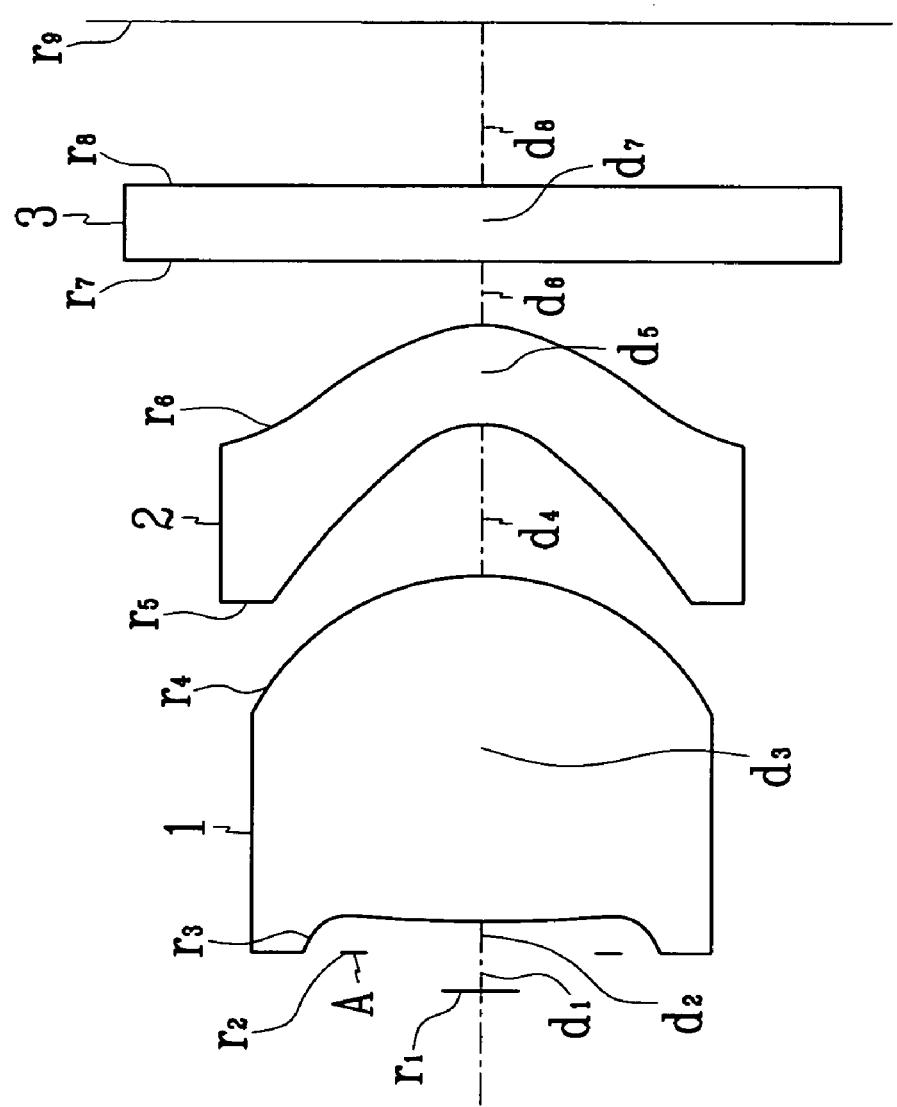
FIG. 1 shows the configuration of an image-forming optical system according to a first embodiment of the present invention.

In the following detailed description, only the preferred embodiment of the invention has been shown and described, simply by way of illustration of the best mode contemplated by the inventor(s) of carrying out the invention. As will be realized, the invention is capable of modification in various obvious respects, all without departing from the invention. Accordingly, the drawings and description are to be regarded as illustrative in nature, and not restrictive.

FIGS. 1, 3, 5, 7, 9, 11 and 13 illustrate the configuration of the image-forming optical systems according to the various embodiments of the present invention.

As shown in FIGS. 1, 3, 5, 7, 9, 11 and 13, the image-forming optical system according to each embodiment of the present invention includes, in order from an object side, an iris diaphragm A, a first lens 1 having a positive refractive power, and a second lens 2 having a negative refractive power. Additionally, the image-forming optical system includes an optical filter 3 located on the image side of the second lens 2.

The first lens has at least one aspheric surface and a convex surface on the image side. The second lens is a meniscus lens having a convex surface on the image side, and has at least one aspheric surface.

The following description describes the operation of the image-forming optical system according to an embodiment of the present invention as constructed above.

The image-forming optical system according to the embodiment of the present invention basically has a very simple dual lens structure. In particular, the iris diaphragm A is nearest to the object side and the first lens 1 having a positive refractive power is located after the iris diaphragm A. The first lens 1 has a function of determining the total power of the optical system. The second lens 2 having a negative refractive power is arranged on the image side of the first lens 1 to correct aberrations occurring in the optical system.

The image-forming optical system according to the embodiment of the present invention of such a structure can be applied to cameras using an optical filter or a glass plate for protection of an image pickup device, or to cameras using an IR cut-off filter to enhance transmissibility in the visible region or an IR-coated glass plate as an IR-cut-off filter to protect the image pickup device.

For this purpose, the image-forming optical system according to an embodiment of the present invention satisfies the following conditional expression.

$$1.25 < \frac{L_T}{f} < 1.58 \qquad \text{[Conditional Expression 1]}$$

where $L_T$ denotes the total length of the optical system from the object side to an image side; and f denotes the total focal length of the optical system.

The Conditional Expression 1 defines the ratio of the total length of the optical system to the total focal length so as to realize the compactness of the optical system.

When the embodied value falls below the lower limit of the Conditional Expression 1, the angle of the ray converging on the image-forming side (image pickup device side) of the image-forming system (optical filter, image pickup device, etc.) of the camera increases after the main ray of light with respect to each image point passes through the final surface (i.e., the image side of the second lens), thereby rapidly deteriorating the amount of peripheral light.

On the other hand, when the embodied value exceeds the upper limit of the Conditional Expression 1, the total length of the optical system is too long to realize the compactness of the optical system.

The image-forming optical system according to an embodiment of the present invention also satisfies the following conditional expression:

$$-1.5 < \frac{W_p - W}{W_p} < -0.1 \quad \text{[Conditional Expression 2]}$$

where $W_p$ is $$\text{Tan}^{-1}\left(\frac{y}{f}\right);$$

W is the half angle of view for the maximum effective image circle (image side); and y is the height of the maximum effective image.

The Conditional Expression 2 defines the total distortion of the optical system. When the embodied value falls below the lower limit of the Conditional Expression 2, the distortion of the optical system increases to affect the distortion of the image after the object point passes through the optical system.

On the other hand, when the embodied value exceeds the upper limit of the Conditional Expression 2, the optical system can secure neither a wide angle of view nor a large amount of the peripheral light with respect to the center to compensate for a low sensitivity of the image pickup device.

The image-forming optical system according to an embodiment of the present invention also satisfies the following conditional expression.

$$25 < Vd_1 - Vd_2 < 30 \quad \text{[Conditional Expression 3]}$$

where $Vd_1$ denotes the Abbe's value of the d-line ray of the first lens 1; and $Vd_2$ denotes the Abbe's value for the d-line ray of the second lens 2.

The Conditional Expression 3 defines the allocation of the Abbe's value for the media of the first and second lenses 1 and 2.

When the embodied value falls below the lower limit of the Conditional Expression 3, the power of each lens increases so as to correct chromatic aberration and thus another aberration is increased. On the other hand, when the embodied value exceeds the upper limit of the Conditional Expression 3, it becomes difficult to correct a curvature of an image field and a magnification chromatic aberration.

First to fourth embodiments of the present invention that satisfy the aforementioned conditions (Conditional Expressions 1, 2 and 3) are described below.

In the description, "f" is the focal length, "ri (where i=1 to 9)" is the radius of curvature of a lens surface, "di (where i=1 to 9)" is the thickness of a lens or the distance between lenses, "nd" is the refractive index, and "v" is the variance. Here, the unit of length is "mm (millimeter)".

An F-number Fno of the image-forming optical system according to a first embodiment of the present invention has a value of 2.84, a focal distance f is 2.445 mm, and an angle of view (2ω) is 33.42°.

FIG. 1 shows the configuration of an image-forming optical system according to a first embodiment of the present invention that has these characteristics, and Table 1 lists the embodied values for the component lenses of the image-forming optical system shown in FIG. 1.

TABLE 1

| Face Number | Radius of Curvature (r) | Thickness, Distance (d) | Refractive Index (nd) | Variance (v) |
|---|---|---|---|---|
| 1 | ∞ | 0.150000 | | |
| 2 | ∞ | 0.120000 | | |
| *3 | 2.86700 | 1.360000 | 1.525 | 56.2 |
| *4 | −0.88100 | 0.566055 | | |
| *5 | −0.36900 | 0.400000 | 1.584 | 31.0 |
| *6 | −0.61000 | 0.270354 | | |
| 7 | ∞ | 0.300000 | 1.517 | 64.2 |
| 8 | ∞ | 0.649646 | | |
| (image side) 9 | ∞ | 0.000000 | | |

The symbol "*" indicates the aspheric surface. Aspheric surface coefficients can be expressed by the following Equation:

$$x = \frac{cy^2}{1 + \sqrt{1 - (K+1)c^2 y^2}} + Ay^4 + By^6 + Cy^8 + Dy^{10} \quad \text{[Equation 1]}$$

where x is the distance along the optical axis from the vertex of the lens; y is the distance in the direction vertical to the optical axis; c is the inverse (1/R) of the radius of curvature on the vertex of the lens; K is the conical constant; and A, B, C, and D are aspheric surface coefficients.

The aspheric surface coefficients according to the first embodiment of the present invention as determined by the Equation 1 are presented in Table 2. The first and second lenses 1 and 2 respectively have an aspheric surface on both sides thereof.

TABLE 2

| Aspheric Surface Coefficients of Third Face | | Aspheric Surface Coefficients of Fourth Face | |
|---|---|---|---|
| K | 0.541943 | K | −0.321110 |
| A | −0.146695E+00 | A | 0.539293E−01 |
| B | −0.244411E+00 | B | −0.164926E+00 |
| C | 0.894513E+00 | C | 0.260796E+00 |
| D | −0.552653E+01 | D | −0.179268E+00 |
| Aspheric Surface Coefficients of Fifth Face | | Aspheric Surface Coefficients of Sixth Face | |
| K | −1.047881 | K | −1.996812 |
| A | −0.206738E+00 | A | −0.512280E+00 |
| B | 0.253119E+01 | B | 0.132543E+01 |
| C | −0.376267E+01 | C | −0.100378E+01 |
| D | 0.189773E+01 | D | 0.281005E+00 |

Figure 2:
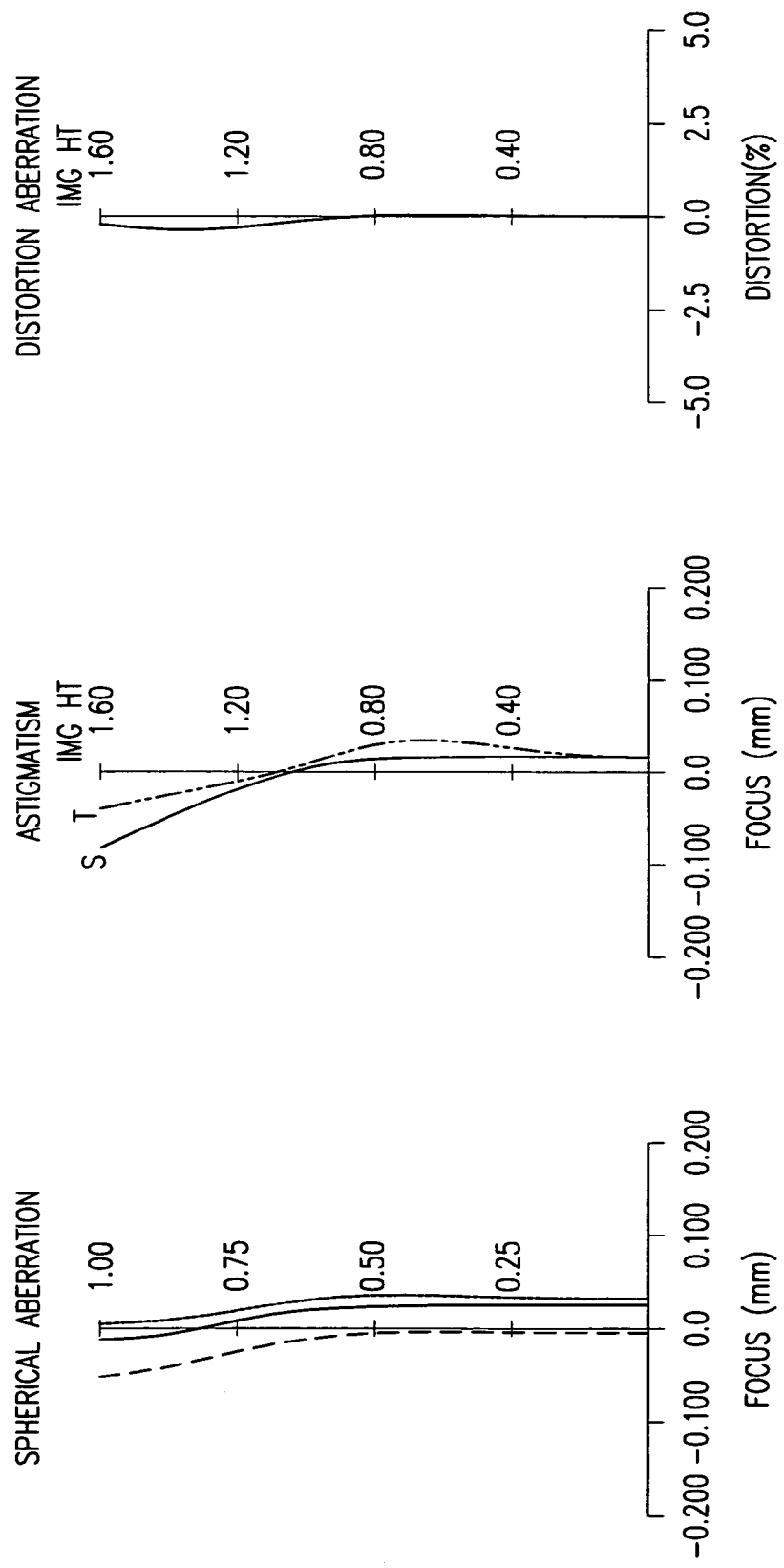
FIG. 2 is a graph showing aberration characteristics of the image-forming optical system according to the first embodiment of the present invention.

FIG. 2 shows the aberration characteristics of the image-forming optical system according to the first embodiment of the present invention having the above embodiment values, specifically, in the order of spherical aberration, curvature of an image field, and distortion. The spherical aberration indicates characteristics for c-, e- and f-lines, which denote a ray of light having a wavelength of 656.3 nm, 546 nm and 486.1 nm, respectively. In the curvature of an image field, the solid line denotes aberrations for the sagittal image side and the dotted line denotes aberrations for the tangential image side. The aberration characteristics according to the respective embodiments of the present invention described below also show the aberrations for the rays of light having the above-defined wavelength and the image side.

For an image-forming optical system according to a second embodiment of the present invention, the F-number Fno is 2.8, the focal length f is 3.284 mm, and the angle of view ($2\omega$) is 34.57°.

Figure 3:
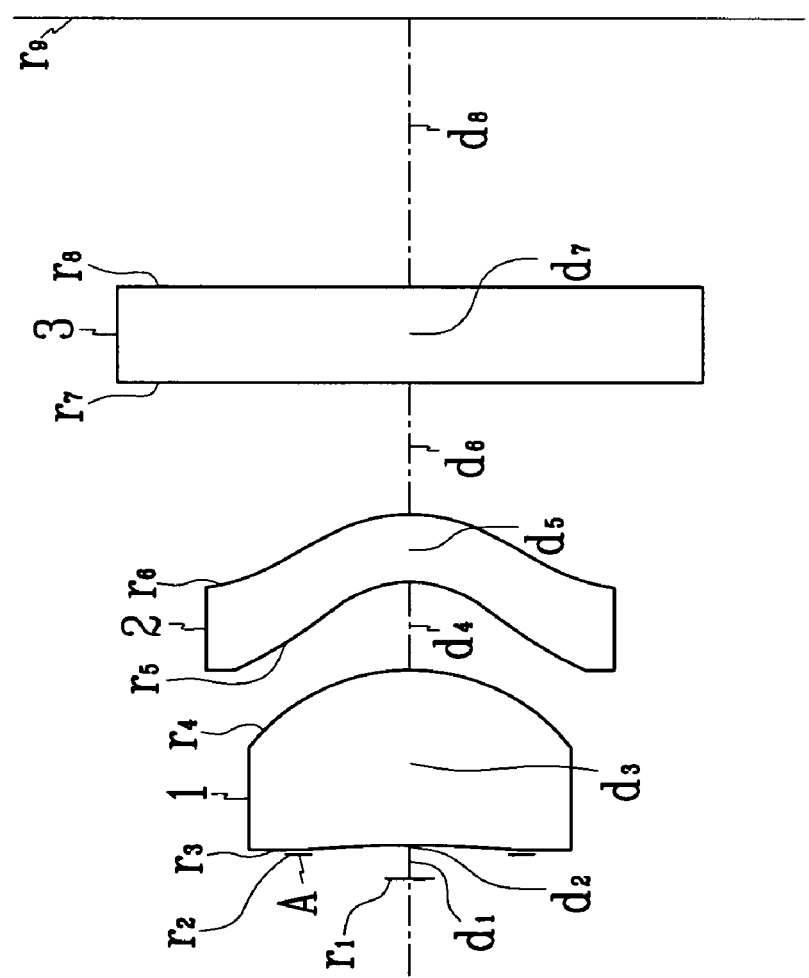
FIG. 3 shows the configuration of an image-forming optical system according to a second embodiment of the present invention.

FIG. 3 shows the configuration of the image-forming optical system according to the second embodiment of the present invention that has these characteristics, and Table 3 lists the embodied values associated with each component lens of the image-forming optical system shown in FIG. 3.

TABLE 3

| Face Number | Radius of Curvature (r) | Thickness, Distance (d) | Refractive Index (nd) | Variance (v) |
|---|---|---|---|---|
| 1 | ∞ | 0.150000 | | |
| 2 | ∞ | 0.050000 | | |
| *3 | −258.88000 | 1.019000 | 1.525 | 56.2 |
| *4 | −1.07100 | 0.509602 | | |
| *5 | −0.55400 | 0.400000 | 1.607 | 27.59 |
| *6 | −0.79400 | 0.785328 | | |
| 7 | ∞ | 0.550000 | 1.517 | 64.2 |
| 8 | ∞ | 1.597070 | | |
| (image side) 9 | ∞ | 0.000000 | | |

The symbol "*" indicates the aspheric surface. In the second embodiment, the first and second lenses 1 and 2 respectively have an aspheric surface on both sides thereof. The aspheric surface coefficients are presented in Table 4.

TABLE 4

| | Aspheric Surface Coefficients of Third Face | | Aspheric Surface Coefficients of Fourth Face |
|---|---|---|---|
| K | 0.000000 | K | −0.485346 |
| A | −0.112087E+00 | A | 0.896333E−02 |
| B | −0.284251E+00 | B | −0.212500E+00 |
| C | 0.410484E+00 | C | 0.512558E+00 |
| D | −0.579496E+00 | D | −0.393624E+00 |
| | Aspheric Surface Coefficients of Fifth Face | | Aspheric Surface Coefficients of Sixth Face |
| K | −0.742558 | K | −0.981247 |
| A | 0.243521E+00 | A | 0.350296E−01 |
| B | 0.126814E+01 | B | 0.396295E+00 |
| C | −0.122281E+01 | C | −0.182694E+00 |
| D | 0.478581E+00 | D | −0.159512E−02 |

Figure 4:
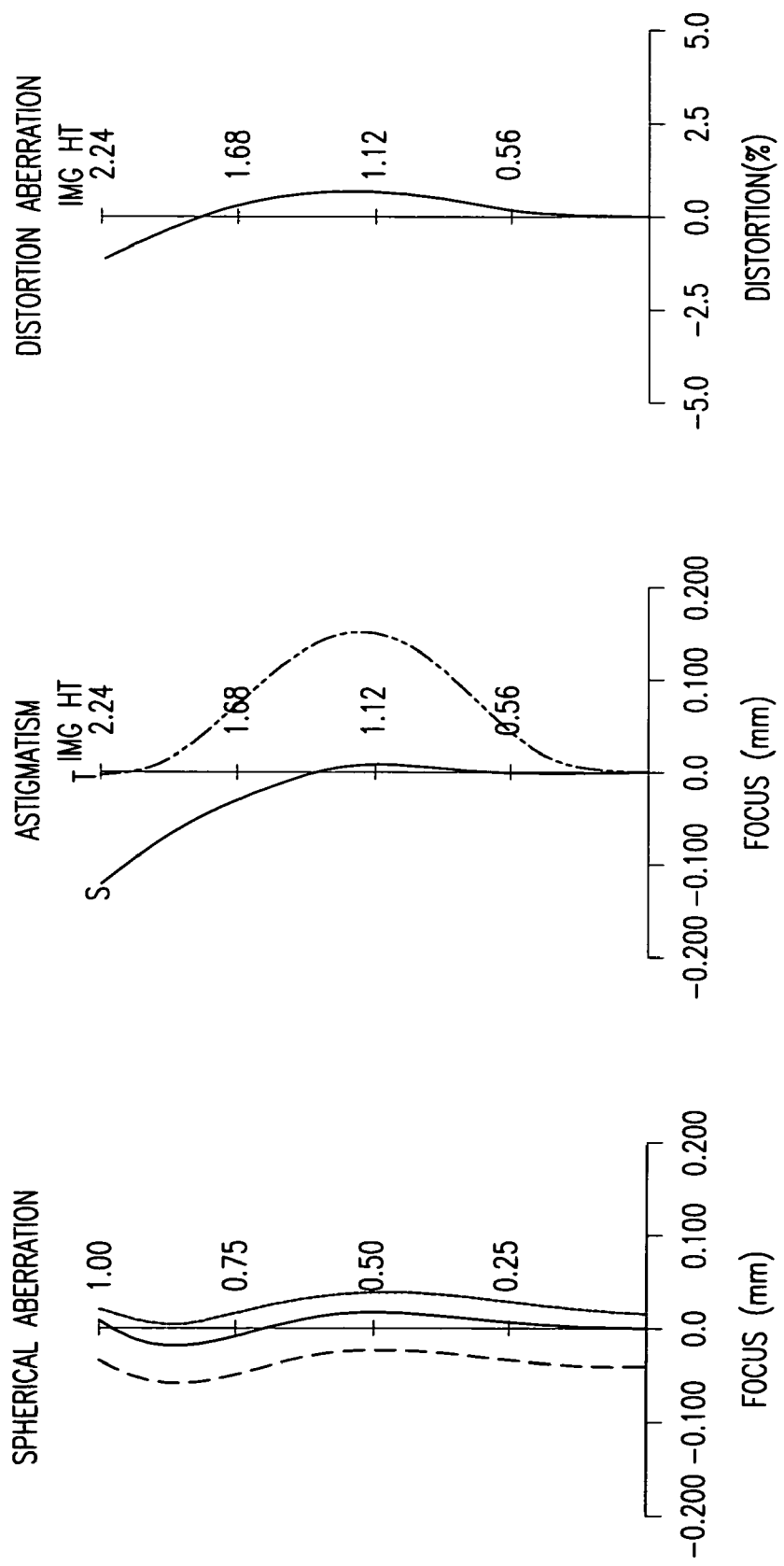
FIG. 4 is a graph showing aberration characteristics of the image-forming optical system according to the second embodiment of the present invention.

FIG. 4 shows the aberration characteristics of the image-forming optical system according to the second embodiment of the present invention that has the above embodiment values.

For an image-forming optical system according to a third embodiment of the present invention, the F-number Fno is 2.8, the focal length f is 3.385 mm, and the angle of view ($2\omega$) is 33.93°.

Figure 5:
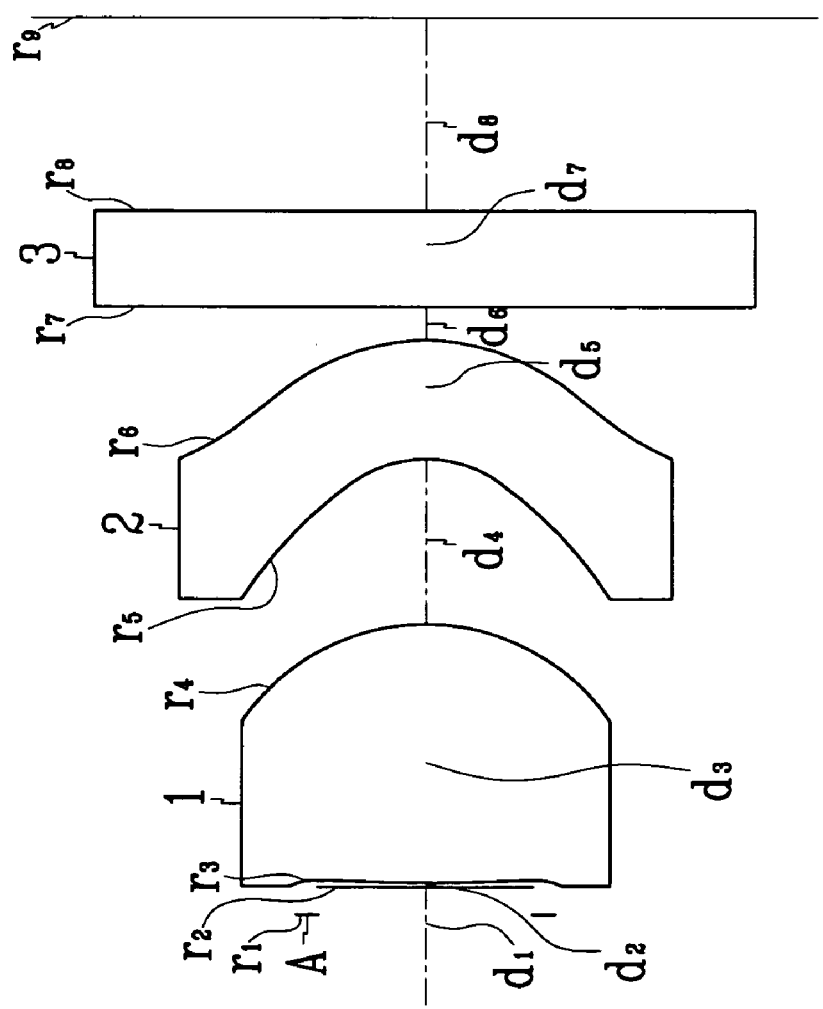
FIG. 5 shows the configuration of an image-forming optical system according to a third embodiment of the present invention.

FIG. 5 shows the configuration of the image-forming optical system according to the third embodiment of the present invention that has the characteristics, and Table 5 lists the embodied values associated with each component lens of the image-forming optical system shown in FIG. 5.

TABLE 5

| Face Number | Radius of Curvature (r) | Thickness, Distance (d) | Refractive Index (nd) | Variance (v) |
|---|---|---|---|---|
| 1 | ∞ | 0.150000 | | |
| 2 | ∞ | 0.030000 | | |
| *3 | 6.51300 | 1.450000 | 1.525 | 56.2 |
| *4 | −1.25900 | 0.923303 | | |
| *5 | −0.70500 | 0.690000 | 1.607 | 27.59 |
| *6 | −1.13800 | 0.200014 | | |
| 7 | ∞ | 0.550000 | 1.517 | 64.2 |
| 8 | ∞ | 1.044995 | | |
| (image side) 9 | ∞ | 0.000000 | | |

The symbol "*" indicates the aspheric surface. In the third embodiment, the first and second lenses 1 and 2 respectively have an aspheric surface on both sides thereof. The aspheric surface coefficients are presented in Table 6.

TABLE 6

| | Aspheric Surface Coefficients of Third Face | | Aspheric Surface Coefficients of Fourth Face |
|---|---|---|---|
| K | 0.000000 | K | −0.252467 |
| A | −0.920969E−01 | A | 0.838535E−02 |
| B | −0.614064E−01 | B | −0.118175E+00 |
| C | 0.118056E+00 | C | 0.131749E+00 |
| D | −0.704346E+00 | D | −0.725158E−01 |
| | Aspheric Surface Coefficients of Fifth Face | | Aspheric Surface Coefficients of Sixth Face |
| K | −3.095642 | K | −3.231028 |
| A | −0.849600E+00 | A | −0.197228E+00 |
| B | 0.825137E+00 | B | 0.719297E−01 |
| C | −0.294824E+00 | C | 0.320525E−01 |
| D | 0.111783E−01 | D | −0.135981E−01 |

Figure 6:
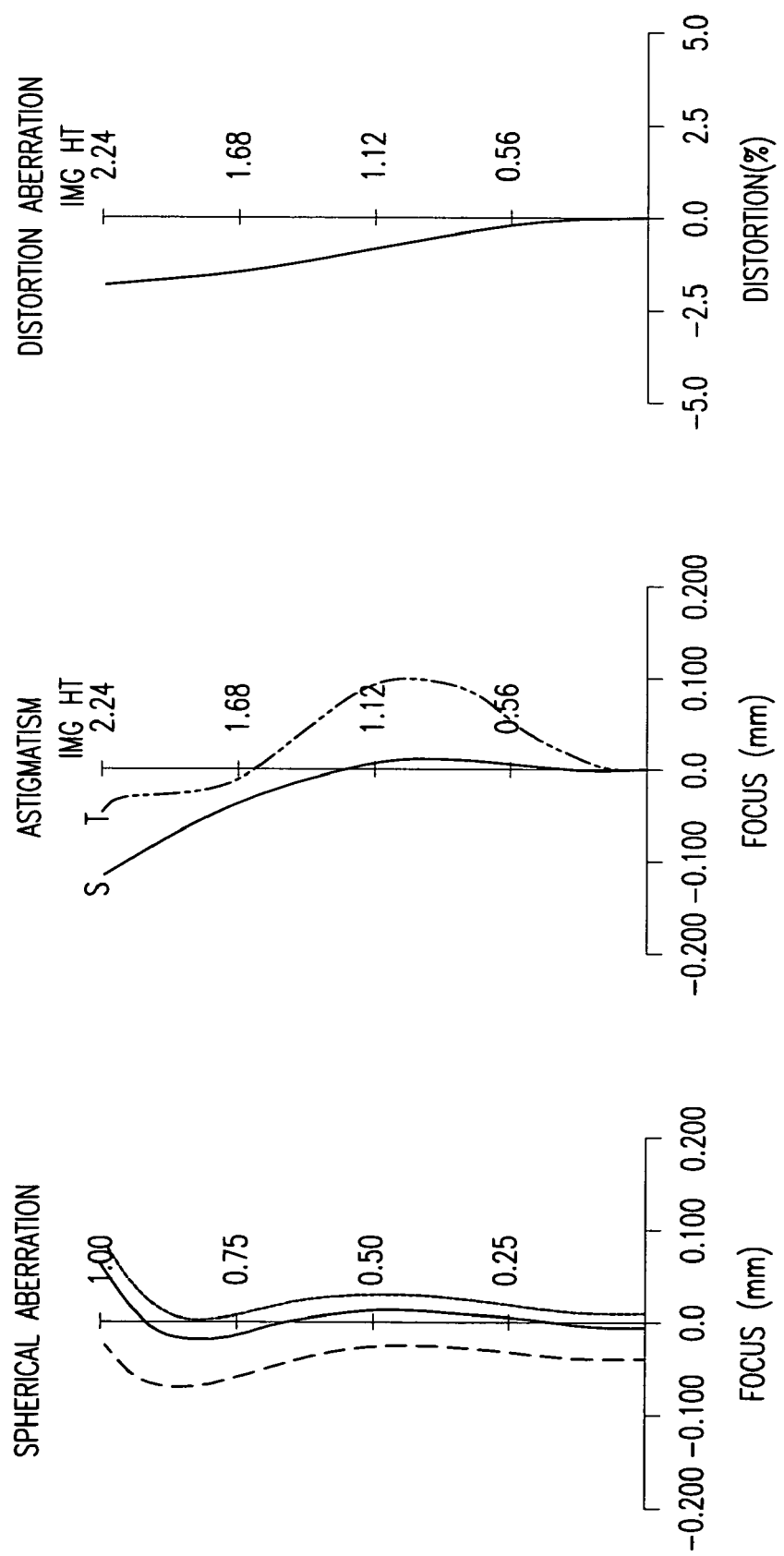
FIG. 6 is a graph showing aberration characteristics of the image-forming optical system according to the third embodiment of the present invention.

FIG. 6 shows the aberration characteristics of the image-forming optical system according to the third embodiment of the present invention that has the above embodiment values.

For an image-forming optical system according to a fourth embodiment of the present invention, the F-number Fno is 2.8, the focal length f is 3.403 mm, and the angle of view ($2\omega$) is 33.44°.

Figure 7:
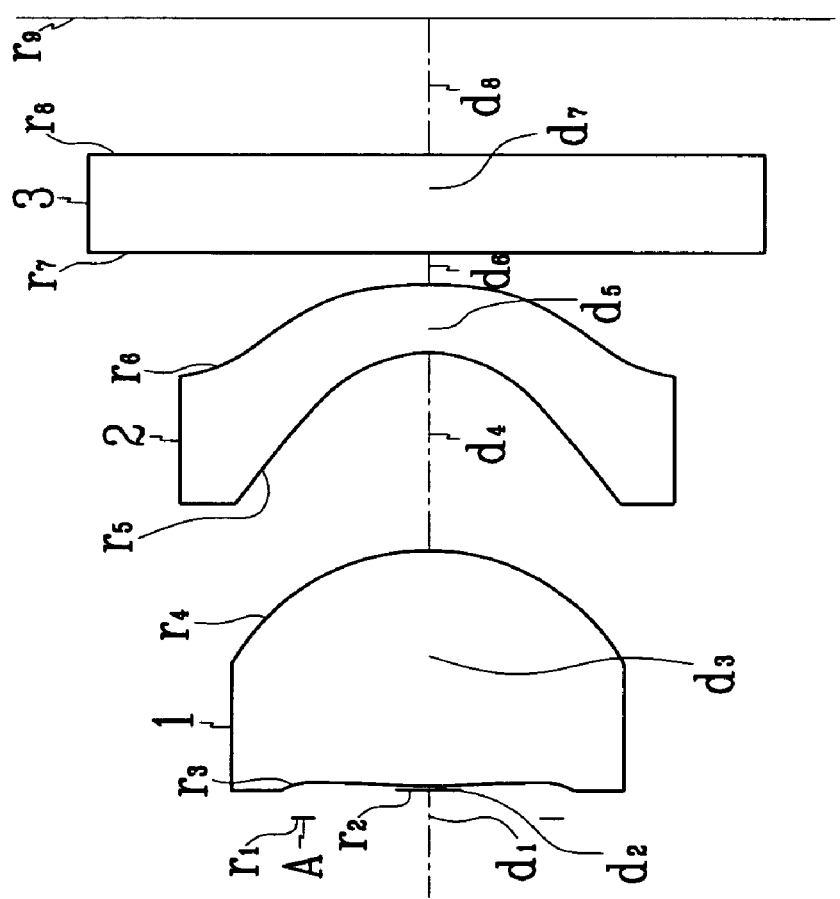
FIG. 7 shows the configuration of an image-forming optical system according to a fourth embodiment of the present invention.

FIG. 7 shows the configuration of the image-forming optical system according to the fourth embodiment of the present invention that has the characteristics, and Table 7 lists the embodied values associated with each component lens of the image-forming optical system shown in FIG. 7.

TABLE 7

| Face Number | Radius of Curvature (r) | Thickness, Distance (d) | Refractive Index (nd) | Variance (v) |
|---|---|---|---|---|
| 1 | ∞ | 0.150000 | | |
| 2 | ∞ | 0.030000 | | |
| *3 | 4.88000 | 1.330000 | 1.525 | 56.2 |
| *4 | −1.45800 | 1.120000 | | |
| *5 | −1.00000 | 0.400000 | 1.607 | 27.59 |
| *6 | −2.16000 | 0.200014 | | |
| 7 | ∞ | 0.550000 | 1.517 | 64.2 |
| 8 | ∞ | 0.749737 | | |
| (image side) 9 | ∞ | 0.000000 | | |

The symbol "*" indicates the aspheric surface. In the fourth embodiment, the first and second lenses 1 and 2 respectively have an aspheric surface on both sides thereof. The aspheric surface coefficients are presented in Table 8.

TABLE 8

|   | Aspheric Surface Coefficients of Third Face |   | Aspheric Surface Coefficients of Fourth Face |
|---|---|---|---|
| K | 0.000000 | K | −0.070376 |
| A | −0.688002E−01 | A | 0.102718E−01 |
| B | −0.150985E+00 | B | −0.201896E+00 |
| C | 0.268742E+00 | C | 0.209763E+00 |
| D | −0.557846E+00 | D | −0.976095E−01 |

|   | Aspheric Surface Coefficients of Fifth Face |   | Aspheric Surface Coefficients of Sixth Face |
|---|---|---|---|
| K | −2.346564 | K | 1.001121 |
| A | −0.105585E+01 | A | −0.328123E+00 |
| B | 0.914878E+00 | B | 0.214007E+00 |
| C | −0.120440E+00 | C | 0.242813E−01 |
| D | −0.869787E−01 | D | −0.204181E−01 |

Figure 8:
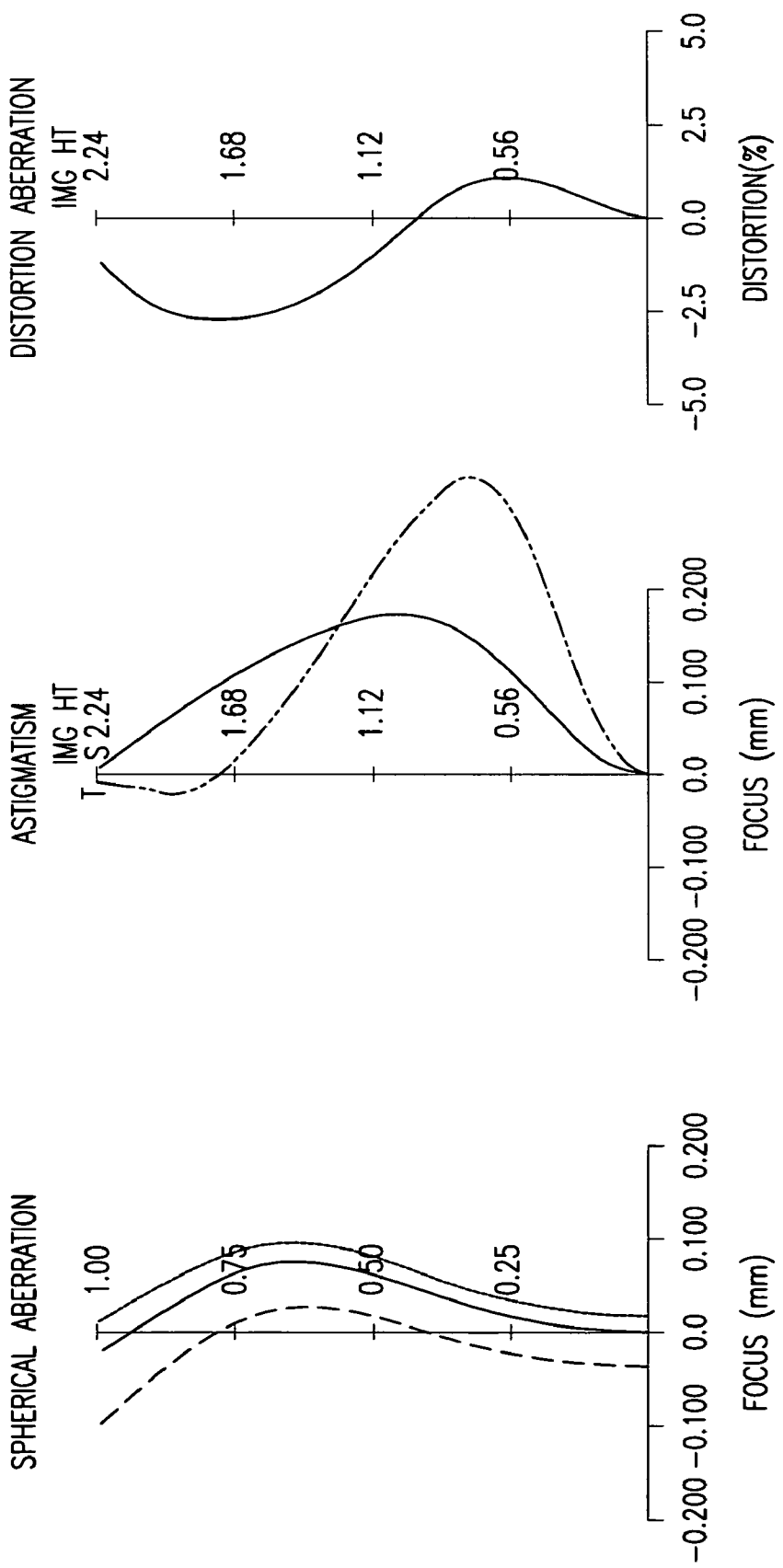
FIG. 8 is a graph showing aberration characteristics of the image-forming optical system according to the fourth embodiment of the present invention.

FIG. 8 shows the aberration characteristics of the image-forming optical system according to the fourth embodiment of the present invention that has the above embodiment values.

The first to fourth embodiments of the present invention as described above, which satisfy the Conditional Expressions 1, 2 and 3, can provide an image-forming optical system that comprises a small number of lenses to easily realize compactness and satisfies a required optical performance.

The embodied values of each Conditional Expression in the image-forming optical systems according to the first to fourth embodiments of the present invention are presented in Table 9.

TABLE 9

|  | Embodiment 1 | Embodiment 2 | Embodiment 3 | Embodiment 4 |
|---|---|---|---|---|
| Conditional Expression 1 | 1.491 | 1.495 | 1.490 | 1.331 |
| Conditional Expression 2 | −0.667 | −0.782 | −1.301 | −0.249 |
| Conditional Expression 3 | 25.2 | 28.61 | 28.61 | 28.61 |

The present invention can also provide an image-forming optical system that satisfies required optical performance and comprises a small number of lenses for easy realization of compactness by adhering to the following conditional expressions, besides Conditional Expressions 1, 2, and 3.

More specifically, the image-forming optical system according to an embodiment of the present invention satisfies the following conditional expression.

$$0.75 < \frac{f_B}{f} < 0.95 \qquad \text{[Conditional Expression 4]}$$

where $f_B$ denotes the distance on the optical axis between the image side surface of the second lens and the image plane, that is, the retrofocal length of the optical system.

The Conditional Expression 4 defines the retrofocal length of the optical system. This is for securing a long retrofocal length in an image-forming optical system using an image pickup device in consideration of the thickness and distance of an optical filter used to prevent moiré and a glass plate used to protect the image pickup device.

When the embodied value falls below the lower limit of the Conditional Expression 4, the retrofocal length of the optical system is too short to arrange an optical filter, a glass plate, or the like, thereby causing a serious deterioration of the performance of the camera.

On the other hand, when the embodied value exceeds the upper limit of the Conditional Expression 4, the total length of the optical system is too long to realize the compactness of the optical system.

The image-forming optical system according to an embodiment of the present invention also satisfies the following conditional expression.

$$-1.5 < \frac{W_p - W}{W_p} < -0.02 \qquad \text{[Conditional Expression 5]}$$

The Conditional Expression 5 defines the total distortion of the optical system in the same manner as the Conditional Expression 2, excepting a different limit range.

The distortion increases when the embodied value falls below the lower limit of the Conditional Expression 5, as in the Conditional Expression 2. On the other hand, the optical system can secure neither a wide angle of view nor a large amount of the peripheral light with respect to the center for compensation of the low sensitivity of the image pickup device, when the embodied value exceeds the upper limit of the Conditional Expression 5.

The image-forming optical system according to an embodiment of the present invention also satisfies the following conditional expression.

$$\frac{|R_1|}{f} > 2.1 \qquad \text{[Conditional Expression 6]}$$

where $R_1$ denotes the curvature of the lens surface nearest to the object side, i.e., the object side of the first lens.

The Conditional Expression 6 defines the shape of the object side of the first lens 1. The first lens 1 has a large radius of curvature and determines the angle of view of the optical system. The optical system that does not satisfy the Conditional Expression 6 has an extremely small angle of view, so it cannot be used for a miniature camera.

The image-forming optical system according to an embodiment of the present invention also satisfies the following conditional expression.

$$\frac{L_T}{f_B} < 2.4 \qquad \text{[Conditional Expression 7]}$$

The Conditional Expression 7 defines the ratio of the retrofocal length to the total length of the optical system.

In the optical system using an image pickup device, a long retrofocal length must be secured so as to arrange an optical filter, a glass plate, or the like. Contrarily, the optical system that does not satisfy the Conditional Expression 7 has an extremely long retrofocal length, so the total length of the optical system becomes too long to realize the compactness of the optical system.

The image-forming optical system according to an embodiment of the present invention also satisfies the following conditional expression:

$$0.35 < \frac{t_2}{f} < 0.52 \quad \text{[Conditional Expression 8]}$$

where $t_2$ denotes the thickness of the first lens.

The Conditional Expression 8 defines the ratio of the thickness of the first lens 1 to the total focal length of the optical system. When the ratio exceeds the upper limit of the Conditional Expression 8, it becomes difficult to correct spherical aberration and coma aberration. On the other hand, when the ratio falls below the lower limit of the Conditional Expression 8, the coma aberration occurs to deteriorate the sharpness and resolution of the image.

The image-forming optical system according to an embodiment of the present invention also satisfies the following conditional expression:

$$0.14 < \frac{t_4}{f} < 0.23 \quad \text{[Conditional Expression 9]}$$

where $t_4$ denotes the thickness of the second lens.

The Conditional Expression 9 defines the ratio of the thickness of the second lens 2 to the total focal length of the optical system. When the ratio exceeds the upper limit of the Conditional Expression 9, it becomes difficult to correct astigmatism and coma aberration. On the other hand, when the ratio falls below the lower limit of the Conditional Expression 9, the negative distortion increases to cause a distortion of the image and makes it difficult to correct the curvature of an image field.

Fifth, sixth and seventh embodiments of the present invention that satisfy the aforementioned conditions (Conditional Expressions 4 to 9) are described below.

For an image-forming optical system according to a fifth embodiment of the present invention, the F-number Fno is 2.8, the focal length f is 2.6 mm, and the angle of view (2ω) is 30.62°.

Figure 9:
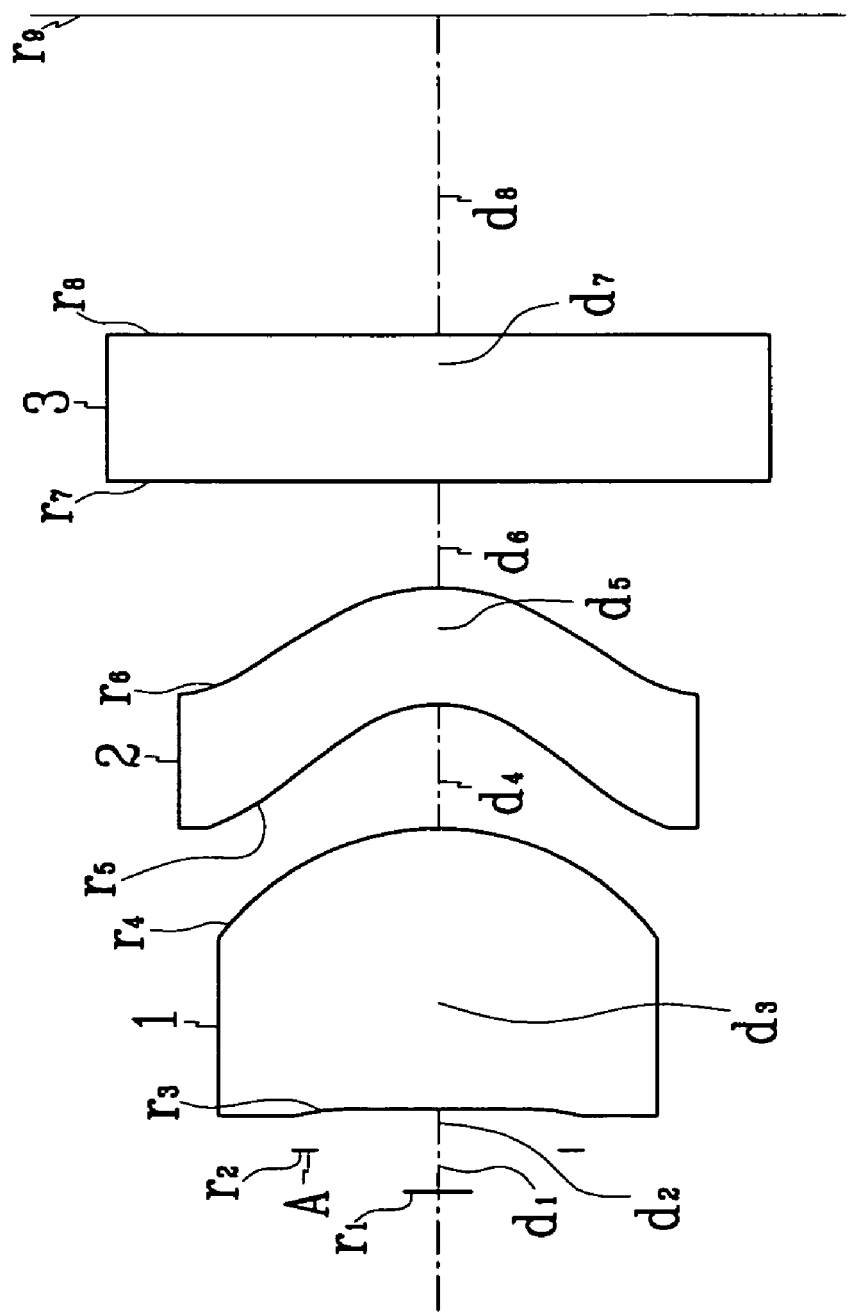
FIG. 9 shows the configuration of an image-forming optical system according to a fifth embodiment of the present invention.

FIG. 9 shows the configuration of the image-forming optical system according to the fifth embodiment of the present invention that has the characteristics, and Table 10 lists the embodied values associated with each component lens of the image-forming optical system shown in FIG. 9.

TABLE 10

| Face Number | Radius of Curvature (r) | Thickness, Distance (d) | Refractive Index (nd) | Variance (v) |
|---|---|---|---|---|
| 1 | ∞ | 0.160000 | | |
| 2 | ∞ | 0.160000 | | |
| *3 | −5288.01000 | 1.070000 | 1.583 | 59.1 |
| *4 | −0.95000 | 0.493862 | | |
| *5 | −0.46800 | 0.420000 | 1.607 | 27.59 |
| *6 | −0.69700 | 0.421569 | | |
| 7 | ∞ | 0.550000 | 1.517 | 64.2 |
| 8 | ∞ | 1.233452 | | |
| (image side) 9 | ∞ | 0.000000 | | |

The symbol "*" indicates the aspheric surface. In the fifth embodiment, the first and second lenses 1 and 2 respectively have an aspheric surface on both sides thereof. The aspheric surface coefficients are presented in Table 11.

TABLE 11

| | Aspheric Surface Coefficients of Third Face | | Aspheric Surface Coefficients of Fourth Face |
|---|---|---|---|
| K | −0.139838e10 | K | −0.617306 |
| A | −0.184276E+00 | A | −0.165508E−01 |
| B | −0.146215E+00 | B | −0.814816E−01 |
| C | −0.861596E+00 | C | 0.169563E+00 |
| D | 0.155364E+01 | D | −0.993681E−01 |

| | Aspheric Surface Coefficients of Fifth Face | | Aspheric Surface Coefficients of Sixth Face |
|---|---|---|---|
| K | −0.803060 | K | −0.962718 |
| A | 0.369603E+00 | A | 0.532252E−01 |
| B | 0.166349E+01 | B | 0.503029E+00 |
| C | −0.183815E+01 | C | −0.254740E+00 |
| D | 0.891812E+00 | D | 0.209739E−01 |

Figure 10:
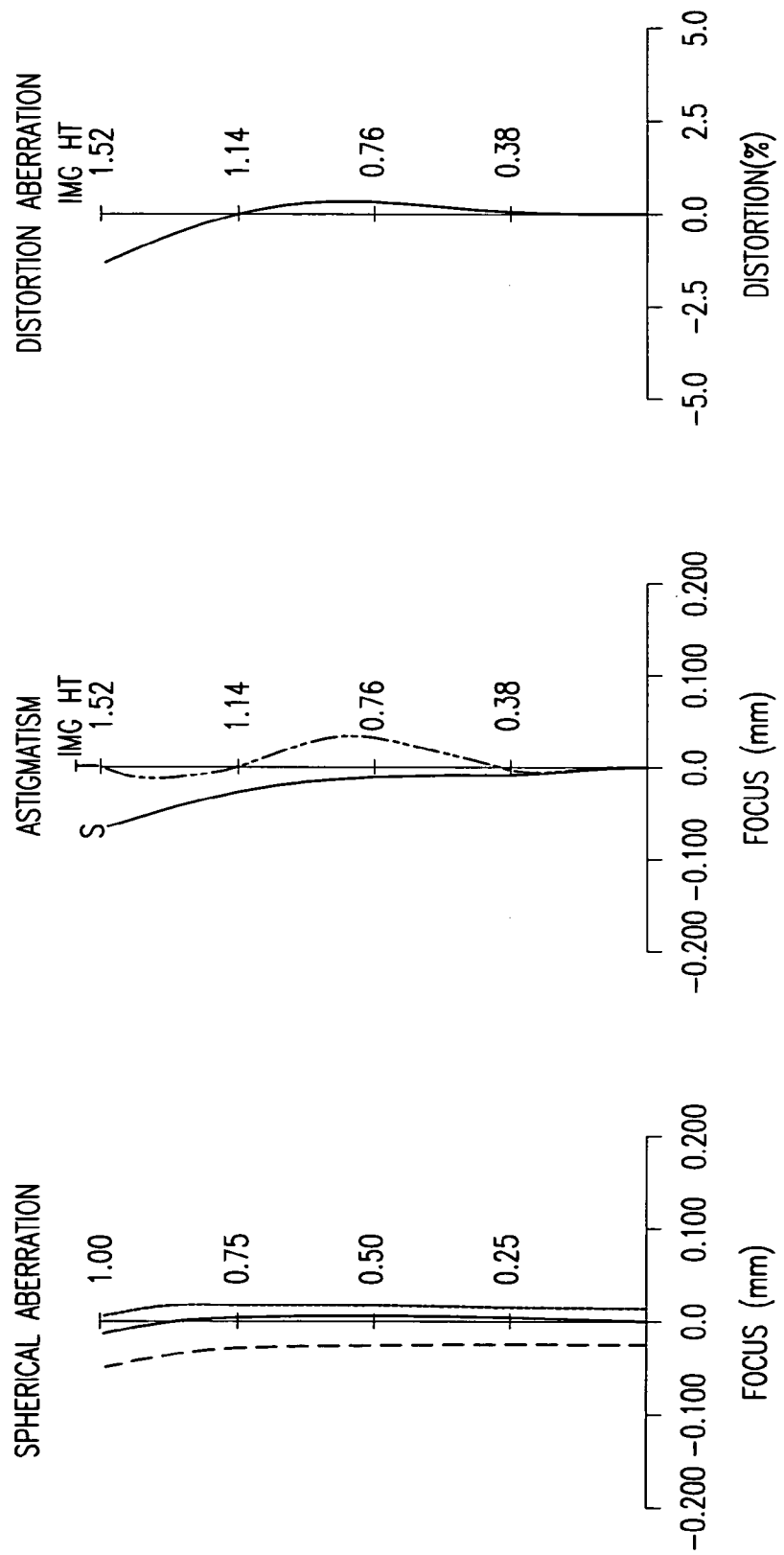
FIG. 10 is a graph showing aberration characteristics of the image-forming optical system according to the fifth embodiment of the present invention.

FIG. 10 shows the aberration characteristics of the image-forming optical system according to the fifth embodiment of the present invention that has the above embodiment values.

For an image-forming optical system according to a sixth embodiment of the present invention, the F-number Fno is 2.8, the focal length f is 2.358 mm, and the angle of view (2ω) is 29.62°.

Figure 11:
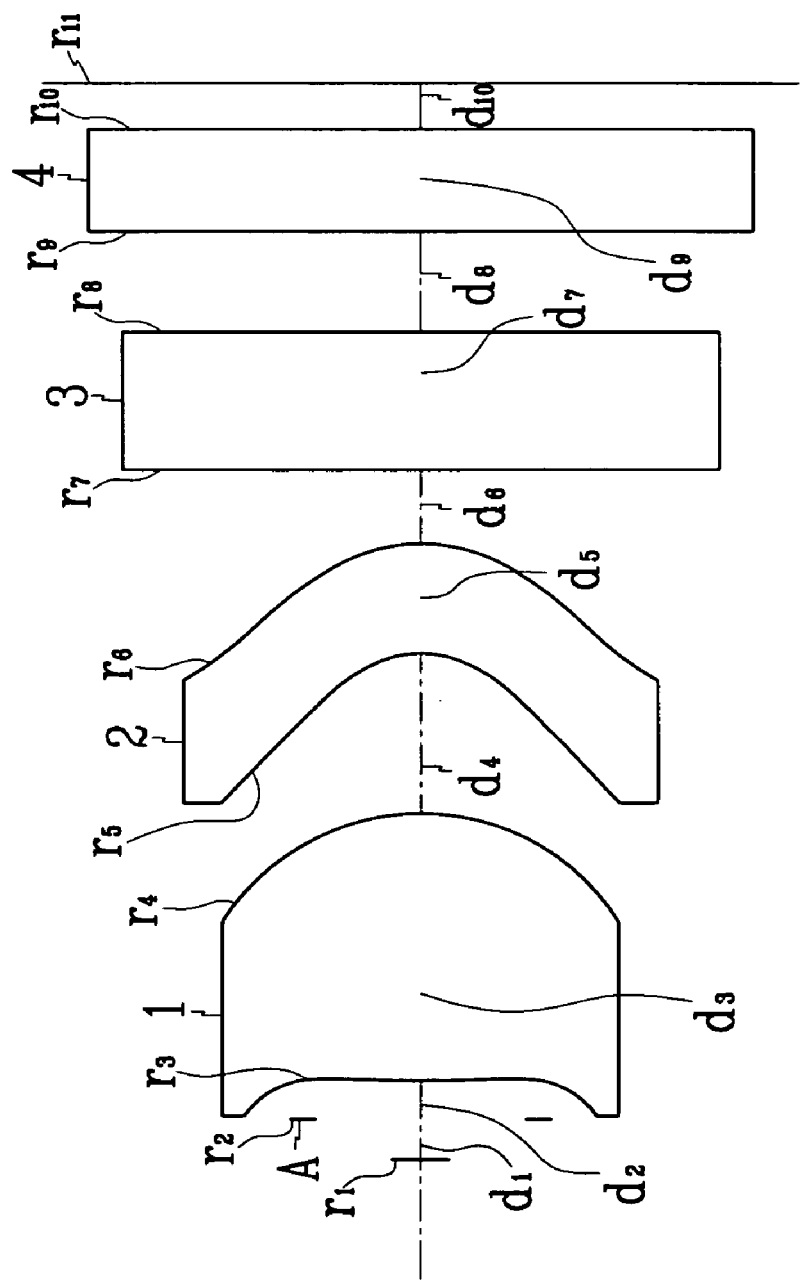
FIG. 11 shows the configuration of an image-forming optical system according to a sixth embodiment of the present invention.

FIG. 11 shows the configuration of the image-forming optical system according to the sixth embodiment of the present invention that has the characteristics. The image-forming optical system according to the sixth embodiment of the present invention further comprises, as shown in FIG. 11, a glass plate 4 for protection of the image pickup device in addition to the optical filter 3 as arranged on the second lens 2.

The embodied values associated with each lens for the image-forming optical system shown in FIG. 5 are presented in Table 12.

TABLE 12

| Face Number | Radius of Curvature (r) | Thickness, Distance (d) | Refractive Index (nd) | Variance (v) |
|---|---|---|---|---|
| 1 | ∞ | 0.160000 | | |
| 2 | ∞ | 0.160000 | | |
| *3 | 11.81000 | 1.040000 | 1.525 | 56.2 |
| *4 | −0.87600 | 0.637961 | | |
| *5 | −0.42300 | 0.450000 | 1.607 | 27.59 |
| *6 | −0.61600 | 0.270362 | | |
| 7 | ∞ | 0.550000 | 1.517 | 64.2 |
| 8 | ∞ | 0.400000 | | |
| 9 | ∞ | 0.400000 | 1.517 | 64.2 |
| 10 | ∞ | 0.184347 | | |
| (image side) 11 | ∞ | 0.000000 | | |

The symbol "*" indicates the aspheric surface. In the sixth embodiment, the first and second lenses 1 and 2 respectively have an aspheric surface on both sides thereof. The aspheric surface coefficients are presented in Table 13.

TABLE 13

| | Aspheric Surface Coefficients of Third Face | | Aspheric Surface Coefficients of Fourth Face |
|---|---|---|---|
| K | 0.000000 | K | −0.062686 |
| A | −0.225175E+00 | A | 0.609215E−01 |
| B | −0.319327E+00 | B | −0.755352E−01 |

TABLE 13-continued

| | | | |
|---|---|---|---|
| C | −0.915425E+00 | C | 0.290687E−01 |
| D | −0.600012E+00 | D | −0.190899E+00 |

| Aspheric Surface Coefficients of Fifth Face | | Aspheric Surface Coefficients of Sixth Face | |
|---|---|---|---|
| K | −0.872817 | K | −0.855823 |
| A | −0.169716E+00 | A | −0.279271E−01 |
| B | 0.199671E+01 | B | 0.340077E+00 |
| C | −0.123634E+01 | C | 0.196164E+00 |
| D | 0.125670E+00 | D | −0.187546E+00 |

Figure 12:
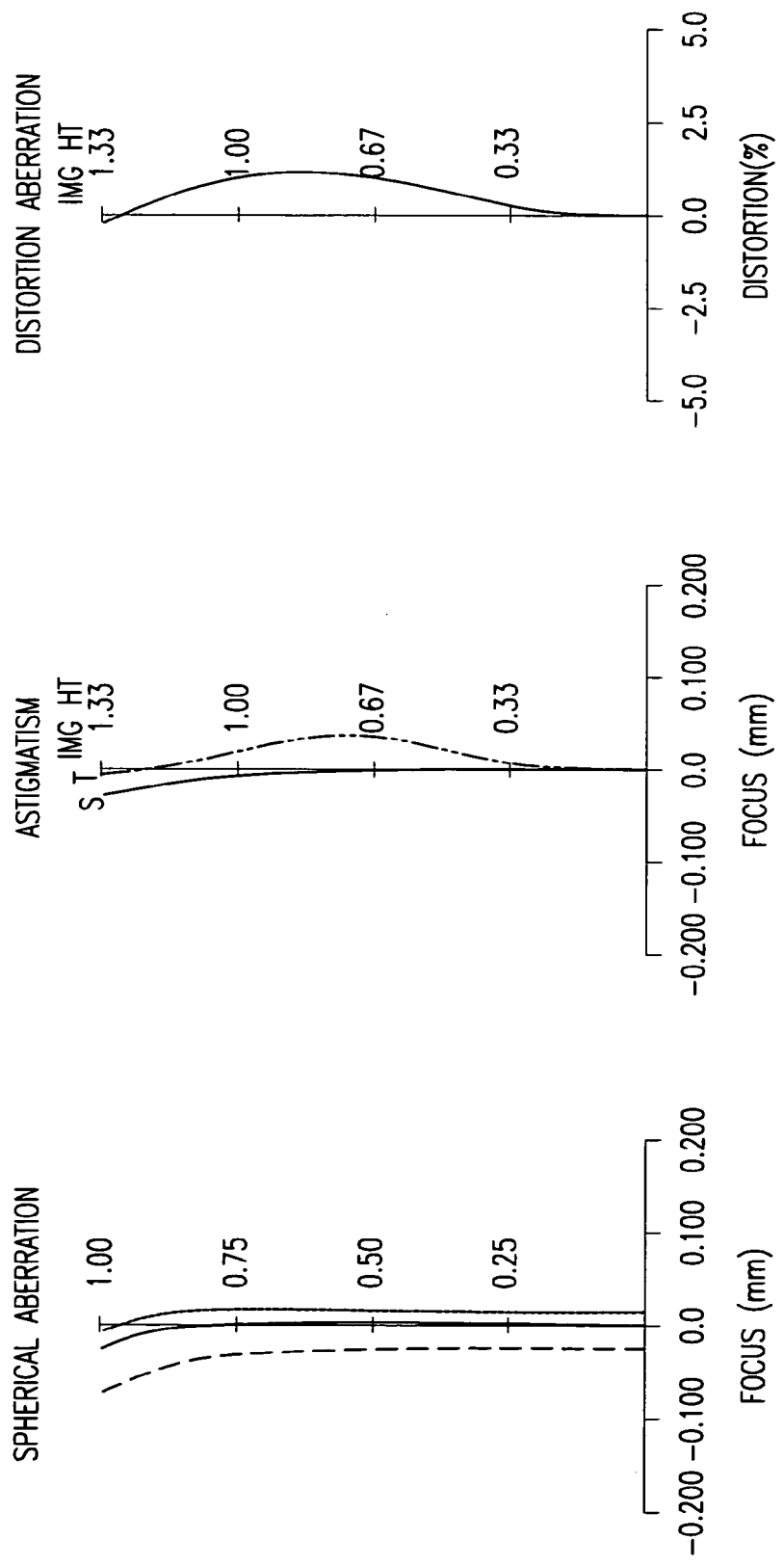
FIG. 12 is a graph showing aberration characteristics of the image-forming optical system according to the sixth embodiment of the present invention.

FIG. 12 shows the aberration characteristics of the image-forming optical system according to the sixth embodiment of the present invention that has the above embodiment values.

For an image-forming optical system according to a seventh embodiment of the present invention, the F-number Fno is 2.8, the focal length f is 2.681 mm, and the angle of view (2ω) is 31.19°.

Figure 13:
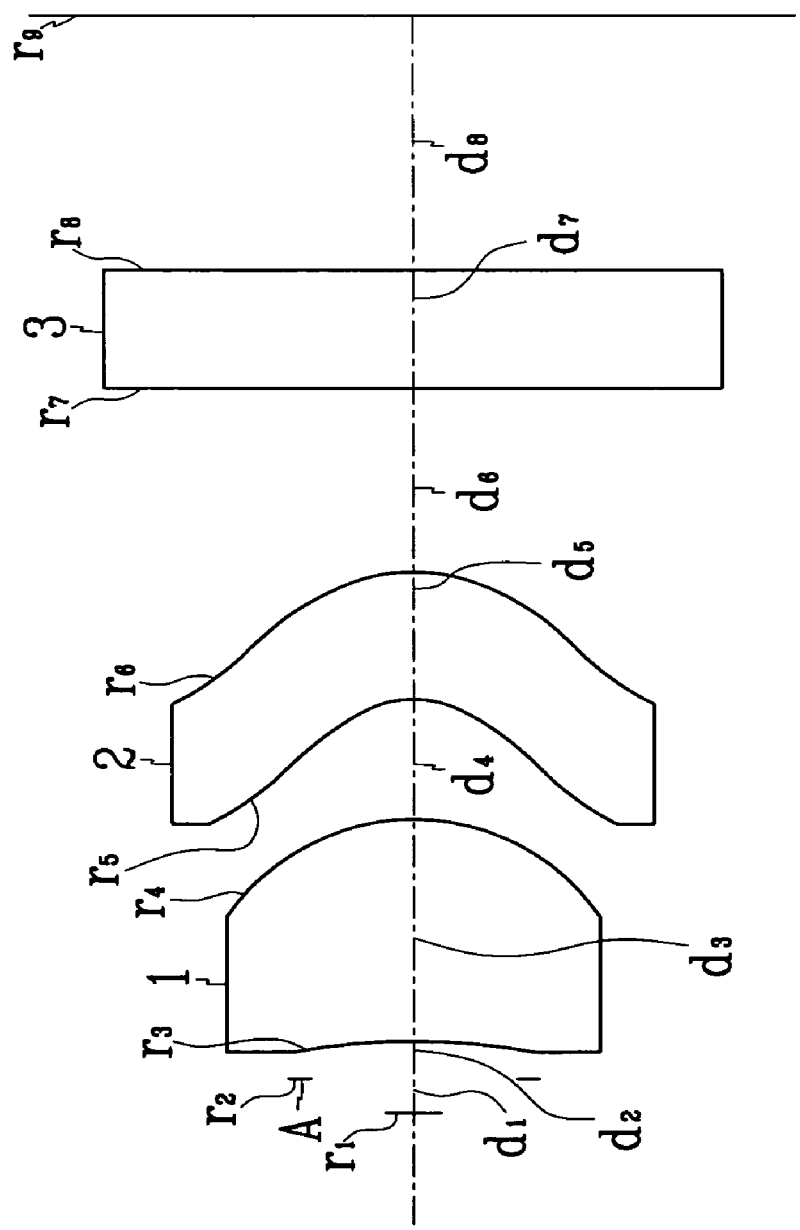
FIG. 13 shows the configuration of an image-forming optical system according to a seventh embodiment of the present invention.

FIG. 13 shows the configuration of the image-forming optical system according to the seventh embodiment of the present invention that has the characteristics, and Table 14 lists the embodied values associated with each component lens of the image-forming optical system shown in FIG. 13.

TABLE 14

| Face Number | Radius of Curvature (r) | Thickness, Distance (d) | Refractive Index (nd) | Variance (v) |
|---|---|---|---|---|
| 1 | ∞ | 0.161538 | | |
| 2 | ∞ | 0.168242 | | |
| *3 | −7.37600 | 1.030000 | 1.525 | 56.2 |
| *4 | −0.84700 | 0.553259 | | |
| *5 | −0.47800 | 0.600000 | 1.584 | 31.0 |
| *6 | −0.72400 | 0.846112 | | |
| 7 | ∞ | 0.550000 | 1.517 | 64.2 |
| 8 | ∞ | 1.071090 | | |
| (image side) 9 | ∞ | 0.000000 | | |

The symbol "*" indicates the aspheric surface. In the seventh embodiment, the first and second lenses 1 and 2 respectively have an aspheric surface on both sides thereof. The aspheric surface coefficients are presented in Table 15.

TABLE 15

| Aspheric Surface Coefficients of Third Face | | Aspheric Surface Coefficients of Fourth Face | |
|---|---|---|---|
| K | 0.000000 | K | −0.756301 |
| A | −0.249247E+00 | A | 0.385687E−01 |
| B | 0.283331E+00 | B | −0.790055E−01 |
| C | −0.225748E+01 | C | 0.111480E+00 |
| D | 0.307337E+01 | D | −0.825811E−01 |

| Aspheric Surface Coefficients of Fifth Face | | Aspheric Surface Coefficients of Sixth Face | |
|---|---|---|---|
| K | −0.869146 | K | −0.704793 |
| A | 0.388165E+00 | A | 0.902893E−01 |
| B | 0.599971E+00 | B | 0.225940E+00 |
| C | −0.421568E+00 | C | −0.559497E−01 |
| D | 0.100493E+00 | D | 0.151387E−01 |

Figure 14:
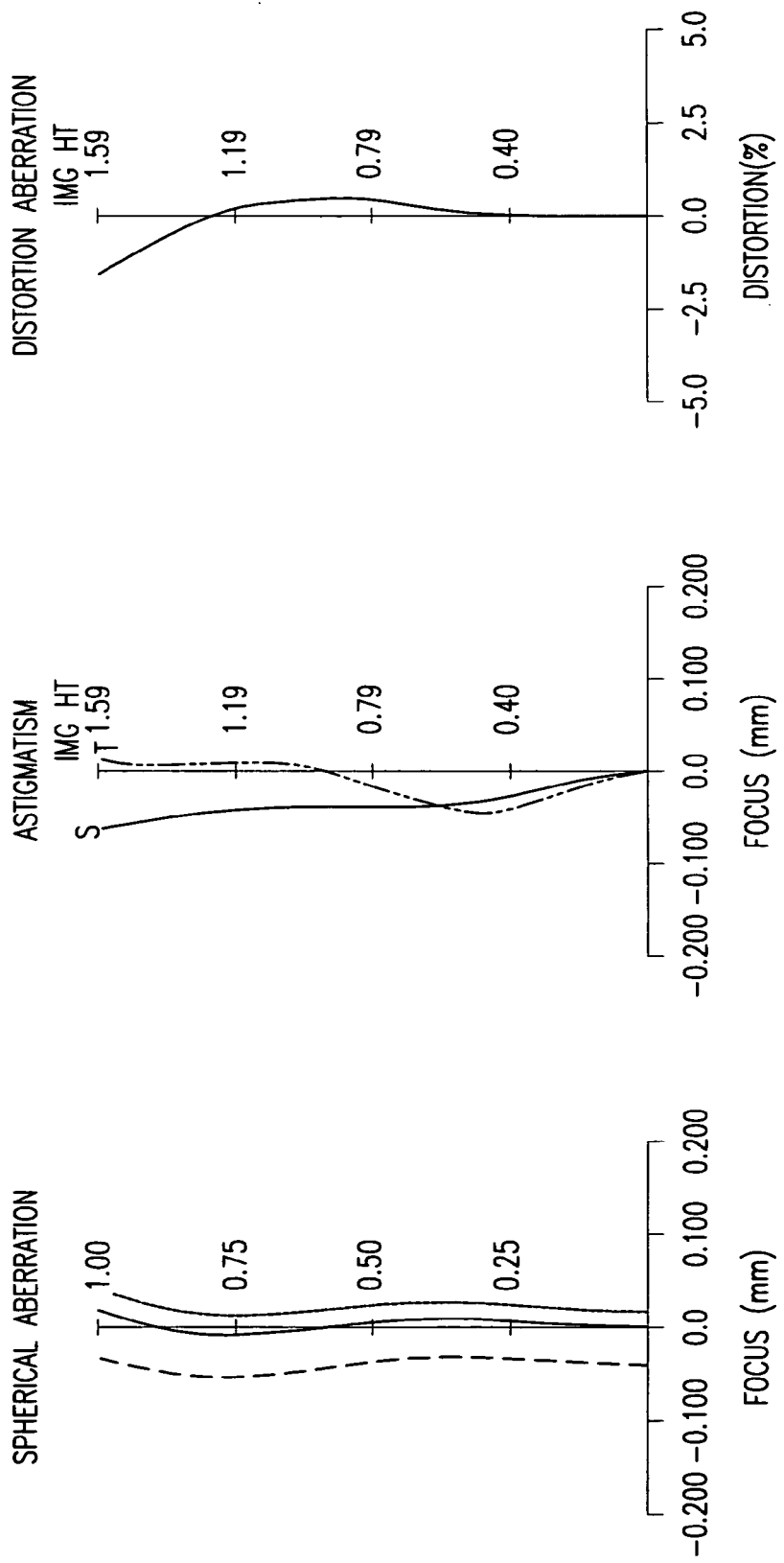
FIG. 14 is a graph showing aberration characteristics of the image-forming optical system according to the seventh embodiment of the present invention.

FIG. 14 shows the aberration characteristics of the image-forming optical system according to the seventh embodiment of the present invention that has the above embodiment values.

The embodied values of each Conditional Expression in the image-forming optical systems according to the fifth, sixth and seventh embodiments of the present invention are presented in Table 16.

TABLE 16

| | Embodiment 5 | Embodiment 6 | Embodiment 7 |
|---|---|---|---|
| Conditional Expression 4 | 0.845 | 0.762 | 0.915 |
| Conditional Expression 5 | −1.019 | −0.038 | −1.173 |
| Conditional Expression 6 | 2033.850 | 5.008 | 2.751 |
| Conditional Expression 7 | 1.976 | 2.273 | 1.958 |
| Conditional Expression 8 | 0.412 | 0.441 | 0.384 |
| Conditional Expression 9 | 0.162 | 0.191 | 0.224 |

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

As described above, the embodiment of the present invention provides an image-forming optical system for cameras using an image pickup device that comprises a small number of lenses to easily realize compactness and satisfies a requirement for a high optical performance.

The embodiment of the present invention also provides an image-forming optical system that has a small iris diaphragm value of less than 2.8 for entrance of a large amount of light to enhance the amount of the peripheral light and to effectively correct the sensitivity of the image pickup device.

The embodiment of the present invention also provides an image-forming optical system that can be easily applied to miniature mobile cameras and realize a high optical performance.

Furthermore, the embodiment of the present invention provides an image-forming optical system that uses aspheric lenses of an appropriate shape to realize a large-scaled production and satisfies a requirement for a high optical performance.

What is claimed is:

1. An optical system, having an object side and an image side, comprising, in order from an object side:
   an iris diaphragm;
   a first lens having a positive refractive power and at least one aspheric surface; and
   a second lens which is a meniscus lens having a convex image side, a negative refractive power and at least one aspheric surface,
   the optical system satisfying the following conditional expression:

$$1.25 < \frac{L_T}{f} < 1.58$$

wherein $L_T$ denotes the total length of the optical system from the object side to an image side; and f denotes the total focal length of the optical system.

2. The optical system as claimed in claim 1, wherein the optical system further satisfies the following conditional expression:

$$-1.5 < \frac{W_p - W}{W_p} < -0.1$$

wherein $W_p$ is defined by $$\mathrm{Tan}^{-1}\left(\frac{y}{f}\right);$$

W denotes the half angle of view for a maximum effective image circle; and y is the height of a maximum effective image.

3. The optical system as claimed in claim 1, wherein the optical system further satisfies the following conditional expression:

$$25 < Vd_1 - Vd_2 < 30$$

where $Vd_1$ denotes the Abbe's value of the d-line ray of the first lens; and $Vd_2$ denotes the Abbe's value for the d-line ray of the second lens.

4. The optical system as claimed in claim 1, wherein the first and second lenses respectively have an aspheric surface on both sides thereof.

5. The optical system as claimed in claim 1, wherein the first lens is a lens having a convex image side.

6. An optical system, having an object side and an image side, comprising, in order from an object side:
an iris diaphragm;
a first lens having a positive refractive power and at least one aspheric surface; and
a second lens having a negative refractive power and at least one aspheric surface, the optical system satisfying the following conditional expression:

$$-1.5 < \frac{W_p - W}{W_p} < -0.1$$

wherein $W_p$ is defined by $$\mathrm{Tan}^{-1}\left(\frac{y}{f}\right);$$

W denotes the half angle of view for a maximum effective image circle; and y is the height of a maximum effective image.

7. The optical system as claimed in claim 6, wherein the optical system further satisfies the following conditional expression:

$$25 < Vd_1 - Vd_2 < 30$$

where $Vd_1$ denotes the Abbe's value of the d-line ray of the first lens; and $Vd_2$ denotes the Abbe's value for the d-line ray of the second lens.

8. The optical system as claimed in claim 6, wherein the first and second lenses respectively have an aspheric surface on both sides thereof.

9. The optical system as claimed in claim 6, wherein the second lens is a meniscus lens having a convex image side.

10. The optical system as claimed in claim 6, wherein the first lens is a lens having a convex image side.

11. An optical system, having an object side and an image side, comprising, in order from an object side:
an iris diaphragm;
a first lens having a positive refractive power and at least one aspheric surface; and
a second lens which is a meniscus lens having a convex image side, a negative refractive power and at least one aspheric surface,
the optical system satisfying the following conditional expressions:

$$0.75 < \frac{f_B}{f} < 0.95$$

and $$\frac{|R_1|}{f} > 2.1$$

wherein f denotes the total focal length of the optical system; $f_B$ denotes the distance on the optical axis between the image side surface of the second lens and the image planes; and R1 denotes the curvature of the object side of the first lens.

12. The optical system as claimed in claim 11, wherein the optical system further satisfies the following conditional expression:

$$\frac{L_T}{f_B} < 2.4$$

wherein $L_T$ denotes the total length of the optical system from the object side to an image side.

13. The optical system as claimed in claim 11, wherein the optical system further satisfies the following conditional expression:

$$0.35 < \frac{t_2}{f} < 0.52$$

wherein $t_2$ denotes the thickness of the first lens.

14. The optical system as claimed in claim 11, wherein the optical system further satisfies the following conditional expression:

$$0.14 < \frac{t_4}{f} < 0.23$$

wherein $t_4$ denotes the thickness of the second lens.

15. The optical system as claimed in claim 11, wherein the optical system further satisfies the following conditional expression:

$$-1.5 < \frac{W_p - W}{W_p} < -0.02$$

wherein $W_p$ is defined by $$\mathrm{Tan}^{-1}\left(\frac{y}{f}\right);$$

W denotes the half angle of view for a maximum effective image circle; and y is the height of a maximum effective image.

16. The optical system as claimed in claim 11, wherein the first and second lenses respectively have an aspheric surface on both sides thereof.

17. The optical system as claimed in claim 11, wherein the first lens is a lens having a convex image side.

18. An optical system, having an object side and an image side, comprising, in order from an object side:
  an iris diaphragm;
  a first lens having a positive refractive power and at least one aspheric surface; and
  a second lens having a negative refractive power and at least one aspheric surface, the optical system satisfying the following conditional expression:

$$-1.5 < \frac{W_p - W}{W_p} < -0.02$$

wherein $W_p$ is defined by $$\mathrm{Tan}^{-1}\left(\frac{y}{f}\right);$$

W denotes the half angle of view for a maximum effective image circle; and y is the height of a maximum effective image.

19. The optical system as claimed in claim 18, wherein the optical system further satisfies the following conditional expression:

$$\frac{|R_1|}{f} > 2.1$$

wherein $R_1$ denotes the curvature of the object side of the first lens.

20. The optical system as claimed in claim 18, wherein the optical system further satisfies the following conditional expression:

$$\frac{L_T}{f_B} < 2.4$$

wherein $L_T$ denotes the total length of the optical system from the object side to an image side.

21. The optical system as claimed in claim 18, wherein the optical system further satisfies the following conditional expressions:

$$0.35 < \frac{t_2}{f} < 0.52$$

$$0.14 < \frac{t_4}{f} < 0.23$$

wherein $t_2$ denotes the thickness of the first lens, and $t_4$ denotes the thickness of the second lens.

22. The optical system as claimed in claim 18, wherein the first and second lenses respectively have an aspheric surface on both sides thereof.

23. The optical system as claimed in claim 18, wherein the second lens is a meniscus lens having a convex image side.

24. The optical system as claimed in claim 18, wherein the first lens is a lens having a convex image side.

* * * * *